United States Patent
Martin

(10) Patent No.: US 11,060,766 B2
(45) Date of Patent: Jul. 13, 2021

(54) SMART ROOF SYSTEM AND METHOD

(71) Applicant: Thomas S. Martin, Tempe, AZ (US)

(72) Inventor: Thomas S. Martin, Tempe, AZ (US)

( * ) Notice: Subject to any disclaimer, the term of this patent is extended or adjusted under 35 U.S.C. 154(b) by 0 days.

(21) Appl. No.: 16/501,581

(22) Filed: May 6, 2019

(65) Prior Publication Data

US 2019/0346178 A1 Nov. 14, 2019

Related U.S. Application Data

(60) Provisional application No. 62/762,513, filed on May 8, 2018.

(51) Int. Cl.
| | |
|---|---|
| *F24S 20/67* | (2018.01) |
| *E04D 3/04* | (2006.01) |
| *E04D 5/10* | (2006.01) |
| *C04B 12/00* | (2006.01) |
| *E04B 1/62* | (2006.01) |

(Continued)

(52) U.S. Cl.
CPC .............. *F24S 20/67* (2018.05); *C04B 12/00* (2013.01); *E04B 1/625* (2013.01); *E04D 3/04* (2013.01); *E04D 3/3605* (2013.01); *E04D 5/10* (2013.01); *C04B 2111/00594* (2013.01)

(58) Field of Classification Search
CPC .. F24S 20/67; F24S 25/61; E04D 5/10; E04D 3/3605; E04D 3/04; C04B 12/00; C04B 2111/00594; E04B 1/625; Y02B 10/20; Y02E 10/47
USPC .... 52/41, 42, 43, 44, 411, 412, 393, 396.02, 52/396.04, 402, 474, 481.1, 762, 775, 52/173.3, 543, 521, 551
See application file for complete search history.

(56) References Cited

U.S. PATENT DOCUMENTS

| | | | |
|---|---|---|---|
| 4,071,994 A * | 2/1978 | Ammann | E04D 3/38 52/393 |
| 5,533,313 A * | 7/1996 | Pike | E04D 1/29 52/712 |

(Continued)

FOREIGN PATENT DOCUMENTS

JP 06316980 A * 11/1994

*Primary Examiner* — Brent W Herring
(74) *Attorney, Agent, or Firm* — Librado Tena

(57) ABSTRACT

A smart roof system and method comprising cementitious sheathing sheets for a roof cover that can be installed directly onto the wood roof sheathing of a structure or home. Said cementitious sheathing sheets are laid over wood roof sheathing directly with permanent adhesive. An aluminum expansion joint is installed to serve as an expansion joint between said cementitious sheathing sheets and to provide support for solar panels.

Aluminum expansion joints have a lower lip and an upper lip, a lower lip of the aluminum expansion joints serves to support cementitious sheathing sheets over the lower lip with adhesive and create a joint directly over the wood roof sheathing. The cementitious sheathing sheets are laid on the wood roof sheathing with an adhesive designed to adhere in a permanent manner to the cementitious sheathing sheets. A next cementitious sheet is then installed into the lower lip of the aluminum expansion joints and overlap on top of the previous cementitious sheet, bonding by the permanent adhesive. The procedure is repeated forming the roof from lower elevation to higher roof elevation, thereby water will flow over the overlapping sections of cementitious sheathing sheets.

4 Claims, 4 Drawing Sheets

(51) Int. Cl.
*E04D 3/36* (2006.01)
*C04B 111/00* (2006.01)

(56) References Cited

U.S. PATENT DOCUMENTS

| | | | | |
|---|---|---|---|---|
| 6,289,646 | B1* | 9/2001 | Watanabe | E04F 13/0821 |
| | | | | 52/235 |
| 6,336,300 | B1* | 1/2002 | Babucke | E04B 1/003 |
| | | | | 277/637 |
| 7,596,911 | B2* | 10/2009 | Turco | E04F 19/062 |
| | | | | 52/127.6 |
| 8,695,303 | B2* | 4/2014 | Swanson | E04F 13/0805 |
| | | | | 52/553 |
| 8,910,443 | B2* | 12/2014 | Wilson | E04F 13/0878 |
| | | | | 52/533 |
| 2007/0144080 | A1* | 6/2007 | Berner | E04D 7/00 |
| | | | | 52/90.1 |
| 2009/0007517 | A1* | 1/2009 | Swanson | E04D 3/24 |
| | | | | 52/543 |
| 2009/0019795 | A1* | 1/2009 | Szacsvay | E04D 1/20 |
| | | | | 52/173.3 |
| 2010/0180527 | A1* | 7/2010 | Kim | E04C 1/40 |
| | | | | 52/309.13 |
| 2011/0185652 | A1* | 8/2011 | Lenox | 52/173.3 |
| 2011/0302859 | A1* | 12/2011 | Crasnianski | F24S 40/44 |
| | | | | 52/173.3 |
| 2012/0055111 | A1* | 3/2012 | Fernandez Fernandez | |
| | | | | E04D 1/14 |
| | | | | 52/543 |
| 2012/0144763 | A1* | 6/2012 | Antonie | E04B 7/22 |
| | | | | 52/90.2 |
| 2016/0305116 | A1* | 10/2016 | Bennett | E04D 12/00 |
| 2017/0077866 | A1* | 3/2017 | MacDonald | F24S 25/70 |

* cited by examiner

SMART ROOF SYSTEM AND METHOD

CROSS-REFERENCE TO RELATED APPLICATIONS

Incorporated by reference is Provisional Patent 62/762,513 filed on May 8, 2018 by Inventor and Applicant Thomas S. Martin, title "Smartroofing System and Method".

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

INCORPORATION BY REFERENCE OF MATERIAL SUBMITTED ON A COMPACT DISK OR AS A TEXT FILE VIA THE OFFICE ELECTRONIC FILING SYSTEM (EFS-WEB

"Not Applicable"

STATEMENT REGARDING PRIOR DISCLOSURES BY THE INVENTOR OR A JOINT INVENTOR

Incorporated by reference is Provisional Patent 62/762,513 filed on May 8, 2018 by Inventor and Applicant Thomas S. Martin, title "Smartroofing System and Method".

BACKGROUND OF THE INVENTION

(1) Field of the Invention

This invention relates to the field of roofing of a structure, roofing material, and system and method of installation of roofing material.

(2) Description of Related Art Including Information Disclosed Under 37 CFR 1.97 and 1.98

A variety of materials and assembly methods have been used to construct roofing, a cover over a habitable area, a cover to prevent entry of the environment, rain, etc. Many of these building materials used over time have significant disadvantages in areas such as reliability, longevity, maintenance, and installation costs. Assembly methods have varied according to materials used for roofing.

Natural slates have been used for roofing, and these materials can last over 50 years. Natural slates require vertical overlapping, so the exposed part of each slate is often less than one half of the total length of the original slate piece. Such overlapping results in a roof that is heavy, often reaching weights in excess of 20 pounds per square foot. For a roofing square of a 10 by 10 foot section of roof, weights may reach around 2000 pounds per roofing square. Natural slate is expensive to purchase, difficult to install and is too heavy for most roofs today. Natural slates are difficult to manufacture and are typically narrow compared to their vertical dimension. Installers are constantly challenged by small pieces which are needed at roof areas such as hips, rakes and valleys. Many of these pieces must be fastened by special means such as custom hooks, custom hangers, specially tied wires or nails driven near areas requiring special waterproofing. These custom areas require specialized skilled labor by installers and are highly time consuming, driving up installation costs for builders.

Natural wood shingles or thicker, heavier wood shakes are expensive and sometimes require special roof construction s as to allow the roof structure to breathe. Wood roofs can have problems with algae and rot. They can also represent a significant fire hazard. This is especially true in areas with wildfires. Wood shingles and shakes are difficult to maintain in hot, dry climates. These climates can cause the wood to become brittle, crack, and become vulnerable to meteorological conditions like hail and high winds.

Clay or concrete tile roofs area heavy and often require special reinforcements so as not to collapse the roof structure. Typical clay and concrete tiles are known to absorb water, sometimes more than 3 percent by weight. This causes problems in climates that experience freezing temperatures. When absorbed water freezes, the water expands, resulting in tiles that crack and fail. This results in a short life of the roof, requiring more frequent replacement. Clay and concrete tiles often have overlapping or interlocking top and side edges. If these are damaged during installation, roof leaks can often result. These leaks are often not detected until after the roofer has left the job site. Most tile roofs require elevated wooden battens which run horizontally along the roof. These battens are usually wooden pieces such as the one by twos which are nailed flat to the roof. If a tile fails or cracks, water can penetrate to the roofing felt layer and the batten causes a dam. This built up water accumulates and can run sideways until it finds a way inside the house, typically through a nail hole, leading to costly water damage.

Synthetic roofing products have been developed to simulate natural material roofs such as slate or wood. Typical synthetic roofing products include plastic, rubber, fiberglass and other composite materials. Each of these prior art synthetics have been associated with problems such as color fading, cracking, curling, peeling and other conditions which shorten the life of the roof.

Most roofing tiles and slates require nails to be driven through the product or through nail holes provided in the tiles or slates. During installation, the installer may over drive the nails resulting in a broken or damaged tile. Conversely, if the nail is under driven, a raised nail head may create a stress point on the tile above it, resulting in the tile breaking.

Natural roofing products and tiles are typically individual, narrow pieces which take time to install and fasten. These products have a joint line between each narrow, individual piece which increases the likelihood of water penetration and infiltration to the roof deck and the structure below.

Prior art roofing panels are generally designed with tongue-and-groove type design or otherwise side overlapped to accommodate water channeling between panels along their side edges. In order for the channel to be durable enough to withstand handling during installation and environmental stresses, the increased thickness also reduces the architectural simulations the tile may intend. Other prior art materials include metal or steel which is stamped to include side locking channels but are limited in their intended architectural replications.

The major function of a roof is to protect a home from the elements such as snow, rain, wind, etc. A roof comprises the following components:

i. Underlayment, normally comprising asphalt paper or membrane that's laid over plywood sheathing in order to seal the roof from damaging elements such as snow, rain, ice, etc. The use of a membrane is typically required, a waterproof membrane, a sweat sheet or vapor barrier, with the underlayment asphalt paper serving the triple function.

ii. Flashing, which refers to metal pieces that are used to divert water from places where it might collect, such as hips and valleys. Flashing can be made from a variety of materials, such as galvanized flashing, a galvanized alloy, copper, lead coated copper or stainless steel.

iii. Roofing material, which refers to the outermost part of the roof comprising shingles or tile, or the cementitious sheathing sheet material referred to in the present invention. Roofing material sits atop wood roof sheathing or atop an underlayment, forming an outermost barrier against the elements. In residential roofing the same basic types of roofing material have been used for many years such as shingle or tile, however other roofing materials include concrete, wood shingles, or metal. Each of these roofing materials have inherent drawbacks, either in material, installation, weight, or cost. The present invention has advantages in all these areas, especially in installation ease, lower weight, and cost of material and installation.

iv. Trim, which protects the seams in roof areas such as a hip or ridge.

The present invention refers to the various design elements of a roof which are the following:

i. Ridge—the highest point or peak of the roof.

ii. Hip—this is the high point where two adjoining roof sections meet.

iii. Valley—where two sections of the roof slope downward and meet, they create this third element, a valley.

iv. Pitch—this refers to the slope or steepness of the roof.

It is an object of the present invention to provide a system and method to cover a wood roof structure with cementitious sheathing sheets for durability;

It is a further object of the present invention to provide a lighter weight roofing system and method;

It is yet a further object of the present invention to provide a system and method to cover a roof structure with or without an underlayment;

It is a further object of the present invention to provide a system and method to support solar panels with a smart roof system and method;

It is still a further object of the present invention to provide a cementitious sheathing roof cover that can support an ornamental covering such as slate, slate sheathing, foam tiles or other decorative cover.

SUMMARY OF THE INVENTION

An advantage of the present invention is a smart roofing system and method comprising cementitious sheathing sheets for a roof cover that can be installed directly onto the wood roof sheathing of a structure or home. Said cementitious sheathing sheets are laid over wood roof sheathing directly with permanent adhesive. An aluminum expansion joint is installed to serve as an expansion joint between said cementitious sheathing sheets and to provide support for solar panels. A starter strip edge is installed, which goes around the perimeter of the roof to prevent water from running under the edges of the cementitious sheathing sheets. A facia facing is installed around the perimeter of the roof.

Aluminum expansion joints, herein named H aluminum expansion joints have a lower lip and an upper lip, a lower lip of the H aluminum expansion joints serves to support cementitious sheathing sheets over the lower lip with adhesive and create a joint directly over the wood roof sheathing.

The cementitious sheathing sheets are laid on the wood roof sheathing in a manner typical of shingle placement with an adhesive designed to adhere in a permanent manner to the cementitious sheathing sheets, said adhesive is water submersible and remains flexible after application. A first cementitious sheet is installed at the lower level of the roof and supported by sheathing screws on the upper top portion of the first cementitious sheathing sheet, these sheathing screws are similar to those in use for sheet rock installations. These sheathing screws provide to secure the cementitious sheet while the adhesive cures. A second cementitious sheet is then installed into the lower lip of the H aluminum expansion joints and overlap on top of the sheathing screws of the first cementitious sheathing sheet to cover these sheathing screws from the elements, using the permanent adhesive and additional sheathing screws on upper top portion of the second cementitious sheathing sheet. The procedure is repeated forming the roof from lower elevation to higher roof elevation, thereby water will flow over the overlapping sections of cementitious sheathing sheets.

Once the cementitious sheathing sheets are installed directly to the wood roof sheathing to the top of the roof from each side of the roof structure, then a cover is installed at the area where the sides meet, which is called a hip. The hip cover is of cementitious material and is installed with the permanent adhesive. A protective ultraviolet UV coating that is waterproof, elastomeric, and non-slip is applied to the finished roof cementitious sheathing sheets for protection from the sun.

BRIEF DESCRIPTION OF THE DRAWINGS

FIG. 3 further shows a second H aluminum expansion joint 2 with a cementitious sheathing sheet 23 overlapped on top by a second cementitious sheathing sheet 26 further overlapped by a third cementitious sheathing sheet 27, all interlocked by the first H aluminum expansion joint 2 and by the second H aluminum expansion joint 2, completing two sections of roof cover. Additional sections will be installed to complete the roof, as shown by the arrow on FIG. 3.

DETAILED DESCRIPTION OF THE INVENTION

Incorporated by reference is Provisional Patent 62/762,513 filed on May 8, 2018 by Inventor and Applicant Thomas S. Martin, title "Smartroofing System and Method".

A roofing system of the present invention comprises a top roofing surface of cementitious sheathing sheets roof material formed in sheets of either 3 by 5 feet or 4 by 8 feet. This is the layer of the roofing system and method that provides the top protection surface of a roof structure. This roof surface keeps water out by managing where the water goes. Water normally runs from top elevation to lower elevation on the surface of the cementitious sheathing sheets laid out by the present system and method.

Aluminum expansion joints, herein named H aluminum expansion joints have a lower lip and an upper lip, a lower lip of the H aluminum expansion joints serves to support cementitious sheathing sheets over the lower lip with adhesive and create a joint directly over the wood roof sheathing.

The cementitious sheathing sheets are laid on the wood roof sheathing with an adhesive designed to adhere in a permanent manner to the cementitious sheathing sheets, said adhesive is water submersible, and retains flexibility after installation. A cementitious sheathing sheet is installed at the lower level of the roof and supported by sheathing screws similar to those in use for sheet rock installations. These sheathing screws installed at the top upper portion of the cementitious sheathing sheet provide to secure the cementitious sheathing sheet while the adhesive cures. A next cementitious sheathing sheet is then installed into the lower lip of the H aluminum expansion joints and overlap on top of the sheathing screws of the first cementitious sheathing sheet to cover these sheathing screws from the elements, using the permanent adhesive and additional sheathing screws are installed on the top upper part of the second cementitious sheet. The procedure is repeated forming the roof from lower elevation to higher roof elevation, thereby water will flow over the overlapping sections of cementitious sheathing sheets.

Figure 1:
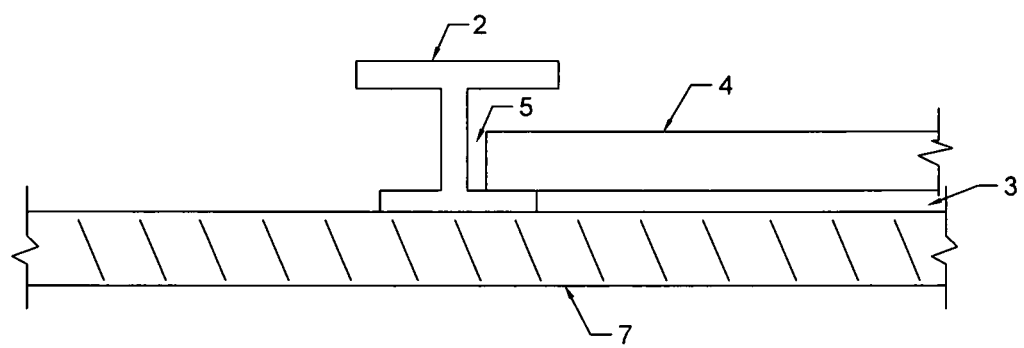
FIG. 1 is a side view of a H aluminum expansion joint 2 supported on wood roof sheathing 7, also showing a cementitious sheathing sheet 4 mounted on H aluminum expansion joint 2 adhered to H aluminum expansion joint 2 by permanent adhesive 5, said cementitious sheathing sheet 4 being adhered to wood roof sheathing 7 by permanent adhesive 3.

As shown in FIG. 1 which is a side view of a H aluminum expansion joint 2 supported on wood roof sheathing 7, also showing a cementitious sheathing sheet 4 mounted on the lower lip of said H aluminum expansion joint 2 adhered to H aluminum expansion joint 2 by permanent adhesive 5, said cementitious sheathing sheet 4 being adhered to wood roof sheathing 7 by permanent adhesive 3. Permanent adhesive 5 is the same permanent adhesive as shown in reference number permanent adhesive 3 but is distinguished to show that cementitious sheathing 4 is interlocked with H aluminum expansion joint 2, both mechanically and by permanent adhesive 5.

Figure 2:
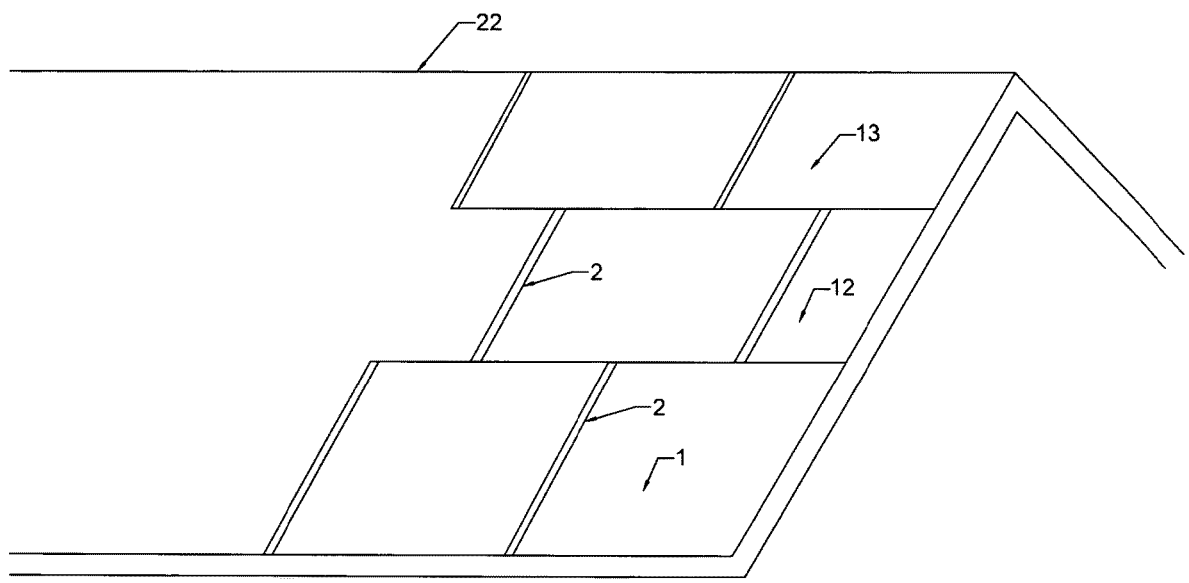
FIG. 2 is a plan view of a roof structure 22 with a singular H aluminum expansion joint 2 supported on roof structure 22 with a first cementitious sheathing sheet 1 overlapped on top by a second cementitious sheathing sheet 12, this cementitious sheathing sheet 12 further overlapped by a third cementitious sheathing sheet 13 to complete a section of roof cover on roof structure 22. Further sections of roof cover will complete the roof cover of roof structure 22.

FIG. 2 is a plan view of a roof structure 22 with a singular H aluminum expansion joint 2 supported on roof structure 22 with a first cementitious sheathing sheet 1 overlapped on top by a second cementitious sheathing sheet 12, this cementitious sheathing sheet 12 further overlapped by a third cementitious sheathing sheet 13 to complete a section of roof cover on roof structure 22. Further sections of roof cover will complete the roof cover of roof structure 22. Cementitious sheathing sheet 1, 12, and 13 are identical to cementitious sheathing sheet 4 of FIG. 1 but are designated different reference numbers to identify an overlapping of cementitious sheathing sheets.

Figure 3:
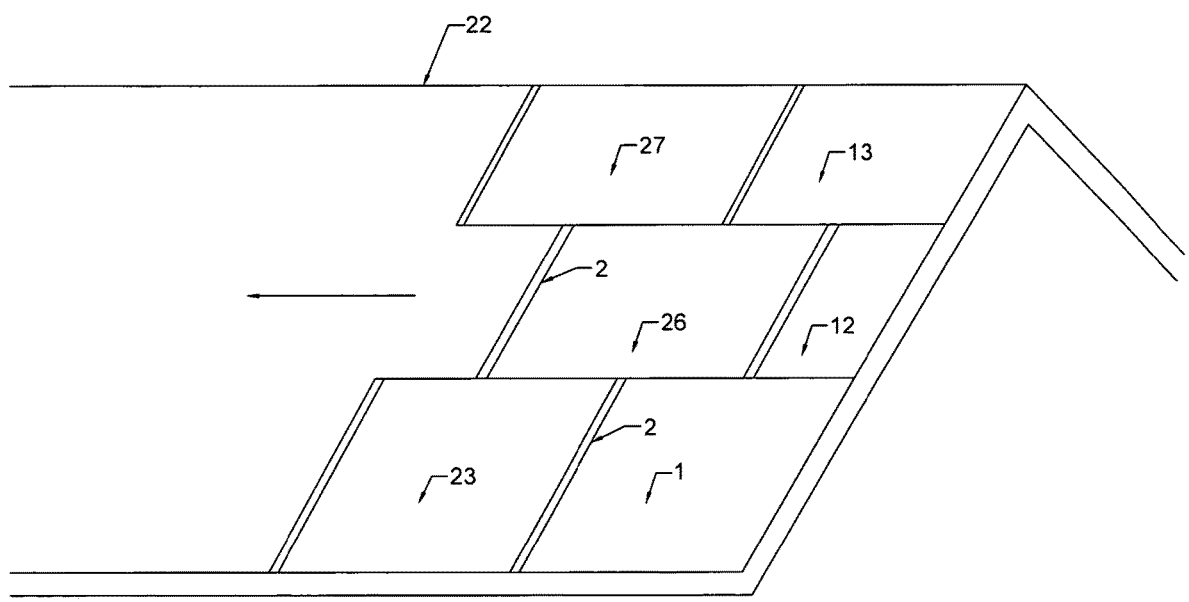
FIG. 3 is a plan view of a roof structure 22 with a first H aluminum expansion joint 2 supported on roof structure 22 with a first cementitious sheathing sheet 1 overlapped on top by a second cementitious sheathing sheet 12, this cementitious sheathing sheet 12 further overlapped by a third cementitious sheathing sheet 13 to complete a section of roof cover on roof structure 22.

FIG. 3 is a plan view of a roof structure 22 with a first H aluminum expansion joint 2 supported on roof structure 22 with a first cementitious sheathing sheet 1 overlapped on top by a second cementitious sheathing sheet 12, this cementitious sheathing sheet 12 further overlapped by a third cementitious sheathing sheet 13 to complete a section of roof cover on roof structure 22. FIG. 3 further shows a second H aluminum expansion joint 2 with a cementitious sheathing sheet 23 overlapped on top by a second cementitious sheathing sheet 26 further overlapped by a third cementitious sheathing sheet 27, all interlocked by the first H aluminum expansion joint 2 and by the second H aluminum expansion joint 2, completing two sections of roof cover. Additional sections will be installed to complete the roof, as shown by the arrow on FIG. 3.

Figure 4:
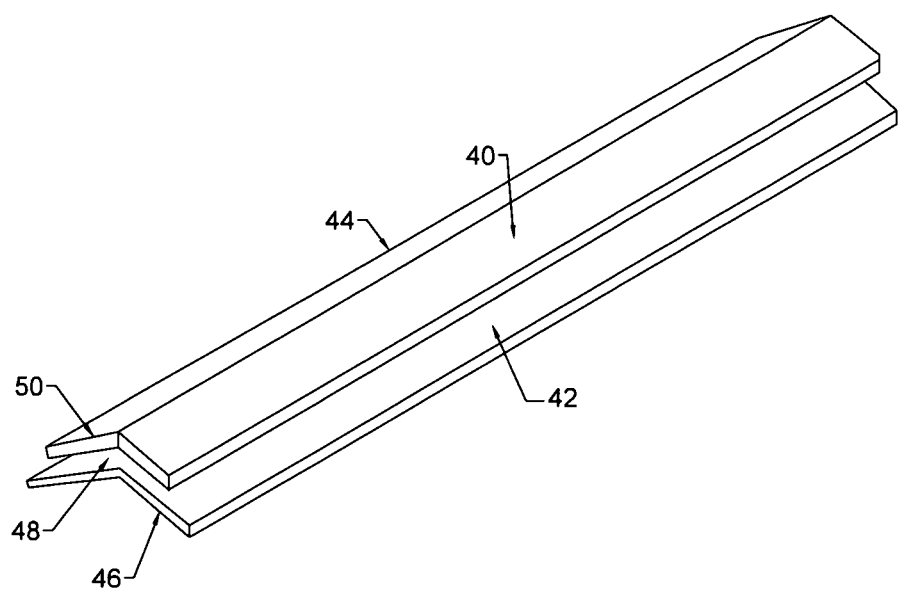
FIG. 4 is an isometric view of a combined top roof hip structure 40 to fit on the top ridge of a roof, the combined top roof hip structure 40, combining a bottom roof hip structure 46 which is applied with screws to roof wood sheathing with a more narrow top roof hip structure 50, applied on top of bottom roof hip structure 46, both structures glued with a fiberglass resin and further joined with permanent adhesive fitted in space 48 continuing on space 42 in full length to totally join both structures, top seams are also filled in with permanent adhesive to provide the combined top roof hip structure 40. Length 44 is normally 8 feet in length.

FIG. 4 is an isometric view of a combined top roof hip structure 40 to fit on the top ridge of a roof, the combined top roof hip structure 40, combining a bottom roof hip structure 46 which is applied with screws to roof wood sheathing with a more narrow top roof hip structure 50, applied on top of bottom roof hip structure 46, both structures glued with a fiberglass resin and further joined with permanent adhesive fitted in space 48 continuing on space 42 in full length to totally join both structures, top seams are also filled in with permanent adhesive to provide the combined top roof hip structure 40.

An advantage of the present invention is that the cementitious sheathing sheets can be installed without use of builder's felt. The cementitious sheathing sheets are laid over wood roof sheathing directly with permanent adhesive. A starter strip is installed, which goes around the perimeter of the roof to prevent water from running under the edges of the cementitious sheathing sheets. A facia facing is installed around the perimeter of the roof.

A next step is to install a metal H aluminum expansion joint as described in the drawings of the present invention, a lower lip of the H aluminum expansion joint will be installed to have cementitious sheathing sheets over the lower lip with adhesive and create a joint as described in the drawings, directly over the wood roof sheathing. After a first course of cementitious sheathing sheets are installed as shown in FIG. 2, another course of cementitious sheathing sheets is installed as shown in FIG. 3, interlocking with the first H aluminum expansion joint, with a second H aluminum expansion joint installed to interlock with the second course of cementitious sheathing sheets, and this procedure continues until the roof is completed.

The cementitious sheathing sheets are laid on the wood roof sheathing with an adhesive designed to adhere in a permanent manner to the cementitious sheathing sheets, is water submersible and retains flexibility. A cementitious sheet is installed at the lower level of the roof and supported by sheathing screws similar to those in use for sheet rock installations. These sheathing screws provide to secure the cementitious sheet while the adhesive cures and are installed at the top upper part of the cementitious sheathing sheet. A next cementitious sheet is then installed into the lower lip of the H aluminum expansion joints and overlap on top of the sheathing screws to cover these sheathing screws from the elements, using the permanent adhesive and additional sheathing screws on the top of the second cementitious sheet. The procedure is repeated forming the roof from lower elevation to higher roof elevation, thereby water will flow over the overlapping sections of cementitious sheathing sheets.

These cementitious sheathing sheets are laid over wood roof sheathing 7 as shown in FIG. 1 or can be laid over a layer of builders felt that is laid down over wood roof sheathing to provide a second layer of protection. The following is a procedure of the present invention with use of builder's felt.

A builder's felt is stapled on the roof wood sheathing. This builder's felt comes in rolls rated as either "15-lb" or "30-lb". While most roofing installations require only 15-lb felt, the 30-lb felt is more durable and costs only marginally more, which is the preferred builder's felt of the present invention.

A next step is to install a metal H aluminum expansion joint 2 as shown in FIG. 1 and FIG. 2 and described in the drawings of the present invention, a lower lip of the H aluminum expansion joint 2 will be installed to have cementitious sheathing sheets 4 over the lower lip of H aluminum expansion joint 2 and applied with permanent adhesive 5 to create a joint as described in FIG. 1 of the drawings.

In this alternate method of the present invention, the cementitious sheathing sheets 4 are laid on builder's felt with permanent adhesive 3, an adhesive designed to adhere in a permanent manner to the cementitious sheathing sheets. A cementitious sheathing sheet is installed at the lower level of the roof and supported by sheathing screws similar to those in use for sheet rock installations. These sheathing screws provide to secure the cementitious sheet while the adhesive cures. A next cementitious sheet is then installed into the lower lip of the H aluminum expansion joints and overlap on top of the sheathing screws to cover these sheathing screws from the elements, using the permanent adhesive and additional sheathing screws on the top of the second cementitious sheet. The procedure is repeated forming the roof from lower elevation to higher roof elevation, thereby water will flow over the overlapping sections of cementitious sheathing sheets.

Once the cementitious sheathing sheets are installed to the top of the roof from each side of the roof structure, then a cover is installed at the area where the sides meet, which is called a hip. The hip cover is of cementitious board and is installed with permanent adhesive. In both methods, a coating of UV ultraviolet protective coating is applied to the cementitious sheathing sheets to protect the finished roof from the sun. This UV ultraviolet protective coating is waterproof, elastomeric, and non-slip.

A further object of the metallic H aluminum expansion joints is to provide support for solar panel installation by clamping a support to the top lip of the H aluminum expansion joints, this support further clamps onto a solar panel supporting member. This clamping arrangement is one version of many supporting clamping means, as the H aluminum expansion joint top lip will anchor various clamping arrangements such as glue or Velcro attachment.

Other combinations of roofing materials can give the smart roof system and method various looks to the roof formed by cementitious sheathing sheets, covering the cementitious sheathing sheets with slate stone, slate stone veneer, or foam shingles which are installed with permanent adhesive.

What is claimed is:

1. A smart roof method to install a cementitious sheathing roof directly onto wood roof sheathing of a roof of a structure comprising the following steps:
   install a plurality of metallic expansion joints on said wood roof sheathing with permanent adhesive;
   lay cementitious sheathing sheets on the wood roof sheathing with an adhesive designed to adhere in a permanent manner to the cementitious sheathing sheets and wood roof sheathing;
   lay said cementitious sheathing sheets on the wood roof sheathing of said roof having a lower level and an upper level and a plurality of sides of said roof;
   install a hip cover once the cementitious sheathing sheets are installed directly to the wood roof sheathing from the lower level to the upper level of the roof from each side of the roof, then said hip cover is installed at the upper level of the roof where the sides meet, the hip cover is made of cementitious board and is installed with permanent adhesive; and
   apply a protective ultraviolet UV coating to the finished roof.

2. The claim as in claim 1 wherein said metallic expansion joints comprise aluminum expansion joints, herein named H aluminum expansion joints which have a lower lip and an upper lip, said lower lip of the H aluminum expansion joints serves to support said cementitious sheathing sheets over the lower lip with adhesive, said upper lip to provide support for solar panels.

3. The claim as in claim 2 wherein the cementitious sheathing sheets are laid on the wood roof sheathing with said adhesive designed to adhere in a permanent manner to the cementitious sheathing sheets, a first cementitious sheet is installed at the lower level of the roof and supported by sheathing screws on the upper top portion of the first cementitious sheathing sheet, these sheathing screws provide to secure the cementitious sheet while the adhesive cures, a second cementitious sheet is then installed into the lower lip of the H aluminum expansion joints and overlap on top of the sheathing screws of the first cementitious sheathing sheet to cover these sheathing screws from the elements, using the permanent adhesive and additional sheathing screws on upper top portion of the second cementitious sheathing sheet, the procedure is repeated forming the cementitious sheathing roof from said lower level to said upper level of said roof, thereby water will flow over the overlapping sections of cementitious sheathing sheets.

4. The claim as in claim 1 wherein said protective ultraviolet UV coating is applied to the finished roof cementitious sheathing sheets for protection from the sun, said UV coating being waterproof, elastomeric, and non-slip.

* * * * *